United States Patent [19]

Kobayashi

[11] 4,179,714

[45] Dec. 18, 1979

[54] METHOD OF RECORDING AN INDEX SIGNAL IN DICTATING TAPE RECORDER

[75] Inventor: Minoru Kobayashi, Hachioji, Japan

[73] Assignee: Olympus Optical Company, Ltd., Tokyo, Japan

[21] Appl. No.: 725,964

[22] Filed: Sep. 23, 1976

[30] Foreign Application Priority Data

Sep. 30, 1975 [JP] Japan ................................. 50-118472
Sep. 30, 1975 [JP] Japan ................................. 50-118473

[51] Int. Cl.² ....................... G11B 15/12; G11B 5/02
[52] U.S. Cl. ............................. 360/61; 360/27; 360/72.2
[58] Field of Search ............... 360/13, 95, 96, 27, 360/72, 61, 137; 179/100.1 DR

[56] References Cited

U.S. PATENT DOCUMENTS

| | | | |
|---|---|---|---|
| 2,932,696 | 4/1960 | Shipman, Jr. ........................ | 360/27 |
| 3,333,065 | 7/1967 | Torok ................................... | 360/105 |
| 3,352,169 | 11/1967 | Delin et al. ........................... | 360/61 |
| 3,373,508 | 3/1968 | Holden et al. ........................ | 360/61 |
| 3,636,271 | 1/1972 | Rodenbeck ................. | 179/100.1 DR |
| 3,671,683 | 6/1972 | Rahenkamp ................ | 179/100.1 DR |
| 3,680,871 | 8/1972 | Tupaj et al. .......................... | 360/61 |
| 3,784,127 | 1/1974 | Bachmann ........................... | 360/96 |
| 3,810,241 | 5/1974 | Murata ................................. | 360/96 |
| 3,877,075 | 4/1975 | Wantanabe .......................... | 360/105 |
| 3,881,187 | 4/1975 | Nakamichi .......................... | 360/105 |
| 3,882,545 | 5/1975 | Titus .................................... | 360/137 |
| 3,921,214 | 11/1975 | Nyffenegger ............... | 179/100.1 DR |
| 3,972,071 | 7/1976 | Arrington ............................. | 360/61 |
| 4,051,540 | 4/1976 | Wilder et al. ............... | 179/100.1 DR |

*Primary Examiner*—Vincent P. Canney
*Attorney, Agent, or Firm*—Ostrolenk, Faber, Gerb & Soffen

[57] ABSTRACT

A method of recording an index signal in a dictating tape recorder of the type in which a single button is utilized to switch the recorder to each of a stop, a playback, a record and a tape rewind position. The method comprises moving the button beyond the record position to close a switch which actuates an oscillator for generating an index signal. The signal output from the oscillator is applied to a record head, thereby recording the index signal on a magnetic tape.

5 Claims, 11 Drawing Figures

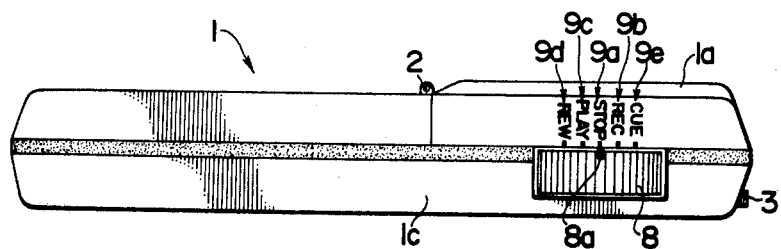
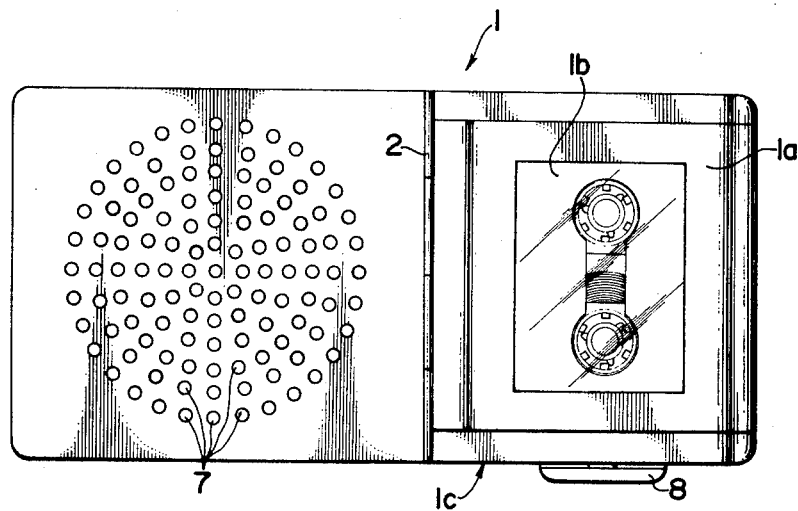
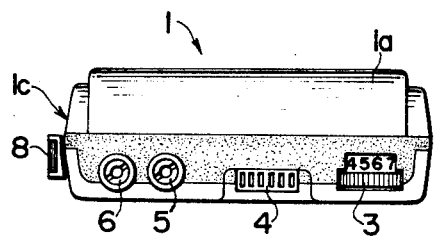

METHOD OF RECORDING AN INDEX SIGNAL IN DICTATING TAPE RECORDER

BACKGROUND OF THE INVENTION

The invention relates to a method of recording an index signal in a dictating tape recorder, and more particularly to such a method used in a recorder of the type in which a single button is utilized to switch the recorder to each of a stop, a playback, and a record position.

A dictating tape recorder, also referred to as a dictating machine, comprises a conventional tape recorder which is modified so that an index signal can be recorded during a record mode. The index signal is utilized to provide a demarcation between recorded material which is to be typed or transcribed during a playback operation of the recorded magnetic tape and recorded material which represents a remark or instruction on the recorded content to be typed and which is not to be typed or transcribed.

The index signal is recorded in a dictating tape recorder by a procedure which is typically referred to as a cue operation, namely, by operating a cue button during a record mode of the tape recorder. However, in the prior art construction, the cue button is provided separately from record, playback and stop buttons, resulting in an increased space requirement and a complex operation and also involving the likelihood of causing a degradation in the appearance of the tape recorder.

On the other hand, in the art of dictating machines, there has been proposed a dictating machine which may be used in combination with a heat sensitive paper to provide an indication of the proportion, on a document to be prepared, of the space which will be occupied by the recorded content and the remaining blank space before the recorded content is directly typed or transcribed on a document, by utilizing a cassette tape in which a pair of index signals of different frequencies are recorded. By way of example, a first index signal of 400Hz and a second index signal of 60Hz may be used, recording the first index signal immediately before the outset of the recorded content and recording the second index signal immediately after the end of the recorded content. When the tape is played on the transcribing machine, a mark is put on the heat sensitive paper in response to the detection of the first index signal, and another mark is put thereon in response to the detection of the second index signal. In this manner, the length between the two marks enables the length of a single sentence or the location of line feed in the recorded content to be recognized beforehand. With this transcribing machine, the layout of the recorded content on the document can be advantageously determined. However, the incorporation of a mechanism which is designed to record these two kinds of index signals into a dictating tape recorder requires a substantial amount of additional space and also involves a complication in its construction, resulting in a complex operation of the overall mechanism.

SUMMARY OF THE INVENTION

In view of the foregoing, it is an object of the invention to provide a method of recording an index signal in a dictating tape recorder of the type in which a single button is utilized to switch the recorder to each of the record, playback and stop conditions and in which the button may also be utilized to perform a recording of the index signal.

In accordance with the invention, a sliding movement of the single button establishes a record, a playback, a stop and a tape rewind mode, and additionally permits a recording of an index signal. As a result, there is no need for the provision of a separate cue button. Since the single button is operated, the operating procedure is greatly simplified and no degradation in the appearance of the tape recorder results. Two kinds of index signals may also be simply recorded by an operation of the single button.

BRIEF DESCRIPTION OF THE DRAWINGS

FIG. 1 is a side elevation of a dictating tape recorder to which the method of the invention may be applied;

FIG. 2 is a top view of the tape recorder shown in FIG. 1;

FIG. 3 is a front view of the tape recorder shown in FIGS. 1 and 2;

DETAILED DESCRIPTION OF PREFERRED EMBODIMENTS

Figure 4:
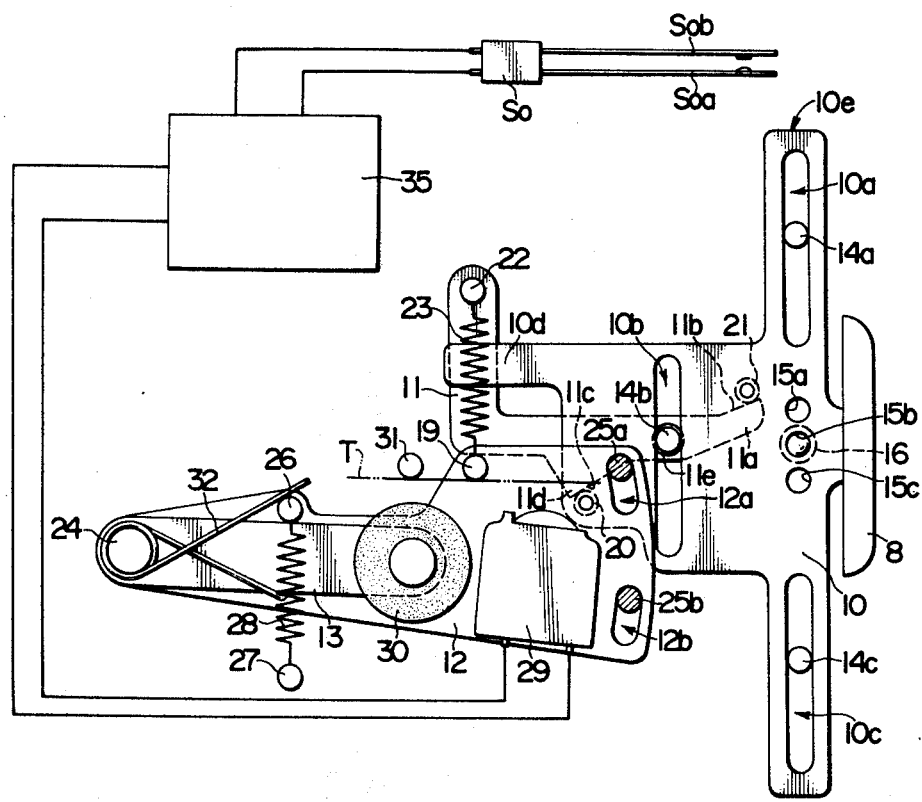
FIG. 4 is a plan view of an operating mechanism of the tape recorder which is operated by a single button.

Referring to FIGS. 1 to 3, there is shown a dictating cassette tape recorder 1 to which the invention is applied. Specifically, FIG. 1 shows the recorder in side elevation, FIG. 2 in top view, and FIG. 3 a front view thereof. The recorder 1 includes a cover 1a which is hinged at 2 to open or close a tape receiving chamber located in the front half of its upper region. A cassette tape may be detachably loaded into the tape receiving chamber by opening the cover 1a. The cover 1a is formed with a transparent window 1b, through which the tape contained within a cassette as well as the progress of its winding can be externally observed (see FIG. 2).

As shown in FIG. 3, provided on or in the front end face of the recorder are a volume control knob 3, a grille 4 for an internally housed microphone, a jack 5 for connection with an earphone and another jack 6 for connection with an external microphone. An acoustic output reproduced by a playback head is developed by a loudspeaker (not shown) which is located within the recorder 1 behind a region containing a multiplicity of small air holes 7 (see FIG. 2) perforated in the top panel of the recorder 1 in the rear half thereof.

According to the invention, the recorder 1 includes an operating button 8 which is mounted on one of side surfaces, 1c, of the recorder 1 so as to be slidable lengthwise thereof. The button 8 is rectangular in configuration and has a reduced thickness, carrying a mark 8a centrally along its upper edge. As shown in FIG. 1, a stop mark 9a, a record mark 9b, a playback mark 9c, a tape rewind mark 9d and a cue mark 9e are inscribed on the side surface 1c along the edge thereof which faces the button 8. Specifically, the stop mark 9a is centrally located, and the record mark 9b is located to the right thereof or toward the front end face of the recorder 1 while the playback mark 9c is located to the left of the stop mark 9a. The tape rewind mark 9d is located to the left of the playback mark 9c or in the rearmost position while the cue mark 9e is located to the right of the record mark 9b or in the foremost position.

A desired mode of the recorder is established by sliding the button 8 so as to bring the mark 8a thereon into alignment with a selected one of the marks 9a to 9e.

Figure 5:
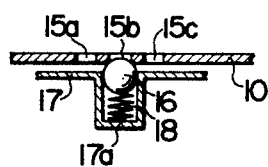
FIG. 5 is a cross section of a click-stop mechanism shown in FIG. 4.

FIG. 4 shows an operating mechanism which comprises an operating plate 10 disposed within the recorder 1, a relay lever 11, a head support member 12 and a pinch roller support arm 13. The button 8 is integrally connected with the operating plate 10, which is formed with three spaced elongate guide slots 10a, 10b, 10c. These slots 10a to 10c extend in a direction parallel to the direction of sliding movement of the button 8, and are engaged by pins 14a, 14b, 14c, respectively, which are fixedly mounted on a stationary member, not shown. The operating plate 10 is associated with a click-stop mechanism which is located adjacent to the button 8. The click-stop mechanism comprises three circular openings 15a, 15b, 15c formed in the operating plate 10, and a ball 16 which is adapted to be resiliently engaged with one of the openings 15a to 15c. As shown in FIG. 5, there is provided a stationary baseplate 17 which is located below the operating plate 10 and in which a recess 17a is formed for receiving a spring 18 and the ball 16. The arrangement is such that the resilience of the spring 18 urges the ball 16 upwardly into engagement with a selected one of the openings 15a to 15c.

When the ball 16 is engaged with the central opening 15b, the mark 8a on the button 8 is aligned with the stop mark 9a, as shown in FIG. 1, and the tape recorder 1 is inoperative at this time. When the button 8 is slid to bring the mark 8a into alignment with the record mark 9b, the operating plate 10 moves together with the button 8 to engage the ball 16 with the opening 15c, where it is stopped. When the button 8 is moved in the opposite direction to bring the mark 8a into alignment with the playback mark 9c, the operating plate 10 is held in a position in which the ball 16 engages the opening 15a.

Returning to FIG. 4, the operating plate 10 has a projection 10d extending inward into the tape recorder, which projection is adapted to move a pin 19 which is fixedly mounted on the head support member 12 and extending vertically, as will be further described later. A pair of depending pins 20, 21 are fixedly mounted on the operating plate 10 at positions which are symmetric to each other with respect to the pin 14b engaging the slot 10b. The pin 20 is located to the left and downward, as viewed in FIG. 4, of the pin 14b while the pin 21 is located to the right and upward side of the pin 14b. These depending pins 20, 21 serve to rock the relay lever 11 as will be shortly described.

The relay lever 11 is disposed below the operating plate 10, and is L-shaped, having a hole 11e, loosely fitting on the pin 14b, formed therein toward the end of its horizontal portion so as to be rockable about this pin 14b. The end 11a of the horizontal portion is bent and extends toward the depending pin 21, bearing against the pin 21 with its upper, inclined edge 11b. The horizontal portion of the relay lever 11 also carries a projection 11d which extends from the lower edge thereof at a position to the left of the fulcrum of its rocking motion and which has an inclined edge 11c for abutment against the pin 20. A pin 22 is fixedly mounted on the end of the vertical portion of the relay lever 11, and a tension spring 23 extends between the pin 22 and the pin 19.

The pin 19 is fixedly mounted on the head support member 12 and extends therethrough in the vertical direction. The support member 12 is rockably mounted on a pivot 24 which is fixedly mounted on a stationary member, not shown, and has its free end extending so as to partly overlie the operating plate 10. The pin 19 is located on the head support member 12 along the upper edge thereof at a location toward the right hand end and beyond the center thereof. Adjacent to the free end, the head support member 12 is formed with a pair of arcuate guide slots 12a, 12b which are in the form of a segment of a circle and which are engaged by a pair of pins 25a, 25b, respectively, fixedly mounted on a stationary member, not shown, thus limiting the extent of rocking motion of the head support member 12. The support member 12 is normally urged to rotate clockwise about the pivot 24 by a tension spring 28 extending between a pin 26 and a stationary pin 27, but the resulting rotation is limited by the abutment between the slots 12a, 12b and the pins 25a, 25b. The pin 26 is fixedly mounted along the upper edge of the support member 12 at a location intermediate the left-hand end and the center thereof. In this position, a magnetic record/playback head 29 which is fixedly mounted on the free end of the head support member 12 is displaced from the magnetic surface of a magnetic tape T into a disabled position spaced from tape T.

The pinch roller support arm 13 is disposed in overlying relationship with the head support member 12, and is rockably mounted on the pivot 24 at its one end while its other end rotatably carries a pinch roller 30. The pinch roller 30 is positioned so as to be located opposite to a capstan 31 and when the arm 13 rotates counter-clockwise about the pivot 24, it moves into abutting relationship with the capstan 31 and with the tape T interposed therebetween, feeding it at a uniform rate by cooperation with the capstan. A torsion spring 32 is disposed on the pivot 24 and has its one end engaged with the pin 26 and its other end engaged with the opposite edge of the arm 13, thus urging it to rotate counter-clockwise about the pivot 24. However, the resulting rotation is prevented by abutment of the inner edge thereof against the pin 26 on the heat support member 12. As the head support member 12 is rotated counter-clockwise about the pivot 24 against the bias supplied by the spring 28, the arm 13 also rotates counter-clockwise about the pivot 24 together with the support member 12. The coiled spring 28 has a resilience which is stronger than the resilience of the connection spring 23.

There is provided a normally open switch $S_O$ for operating an oscillator 35 which is adapted to produce an index signal. The switch $S_O$ has a pair of cooperating movable contacts $S_{Oa}$, $S_{Ob}$ extending into the path of movement of an upper extension 10e of the operating plate 10. As the operating plate 10 is moved to its cue position, the extension 10e bears against and moves the movable contact $S_{Oa}$ into contact with the other contact $S_{Ob}$, thus closing the switch $S_O$. Thereupon, the oscillator 35 generates an index signal, which is applied across the head 29.

In operation, in the stop condition shown in FIG. 4 wherein the ball 16 engages the central opening 15b and the mark 8a on the button 8 is aligned with the stop mark 9a, the cover 1a is opened to load a cassette tape into the cassette tape receiving chamber whereupon the tape T is aligned so as to be passed between the capstan 31 and the pinch roller 30. Then the cover 1a is closed.

Figure 6:
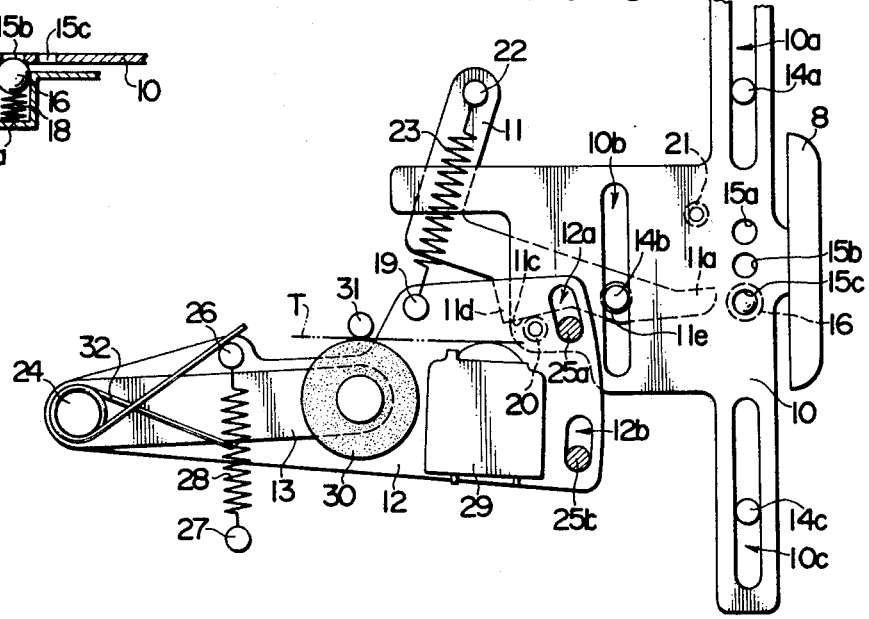
FIGS. 6 to 9 are views similar to FIG. 4, illustrating different operational phases of the operating mechanism.

To establish a record mode of the tape recorder 1, the button 8 is slid toward the front end face of the recorder until the mark 8a becomes aligned with the record mark 9b (see FIG. 1). As the button 8 is slid, the operating plate 10 moves integrally therewith while being guided by the engagement between the slots 10a to 10c and the pins 14a to 14c. When the mark 8a on the button 8 is aligned with the record mark 9b, the ball 16 engages the opening 15c as shown in FIG. 6, and the operating plate 10 is stopped at this position.

When the operating plate 10 has moved in the manner mentioned above, the depending pin 20 thereon has pushed against the inclined edge 11c on the relay lever 11, which lever is therefore rocked clockwise about the pin 14b which serves as the fulcrum. As it rocks, the spring 23 obtains an increased resilience which overcomes the resilience of the coiled spring 28, so that the pin 19, which is connected with the relay lever through the spring 23, is pulled upward, causing a counter-clockwise rotation of the head support member 12 about the pivot 24 while simultaneously carrying the pinch roller support arm 13 therewith. This results in the abutment of the pinch roller 30 against the capstan 31 with the tape T interposed therebetween, and also movement of the magnetic head into its record/playback position in abutment with the magnetic surface of the tape T. In this manner a record mode of the tape recorder 1 is established. It is to be noted that an erase head, not shown, is adapted to engage the tape T to erase unnecessary signals before the recording takes place.

Figure 7:
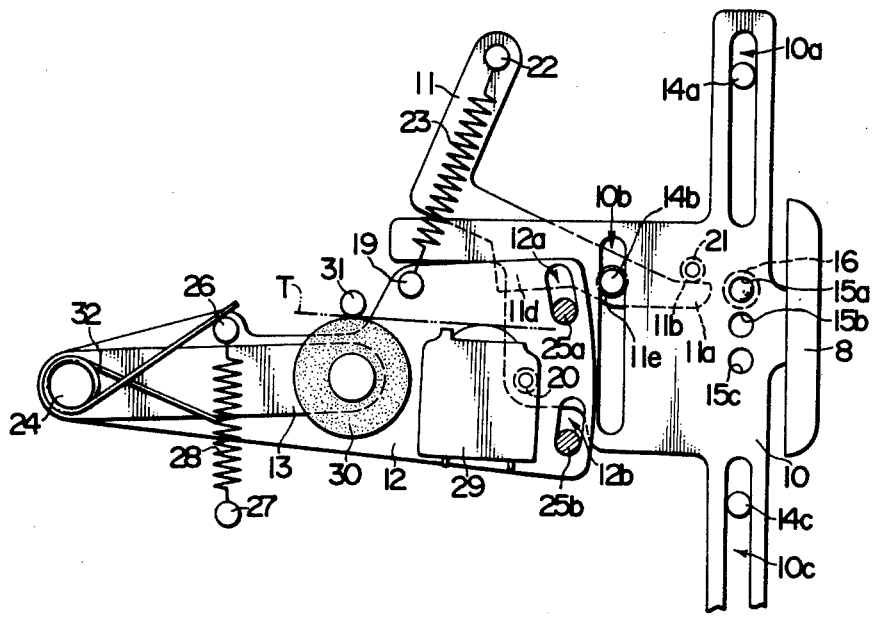

To establish a playback mode of the tape recorder 1, the button 8 is slid toward the rear of the tape recorder until the mark 8a becomes aligned with the playback mark 9c (see FIG. 1). When the button 8 is moved to its playback position, the operating plate 10 is moved to and stopped at a position shown in FIG. 7 where the ball 16 engages the opening 15a. During this sliding movement of the operating plate 10, the depending pin 21 thereon bears against and moves the inclined edge 11b of the relay lever 11, which is therefore rotated clockwise about the pin 14b. As it rotates, the spring 23 again obtains an increased resilience which overcomes the resilience of the coiled spring 28 to pull the pin 19 in an upward direction, whereby the head support member 12 and the pinch roller support arm 13 rotate counterclockwise about the pivot 24, causing the pinch roller 30 to bear against the capstan 31 and causing the head 29 to engage the tape T. In this manner, the tape recorder 1 is placed in its playback mode.

Figure 8:
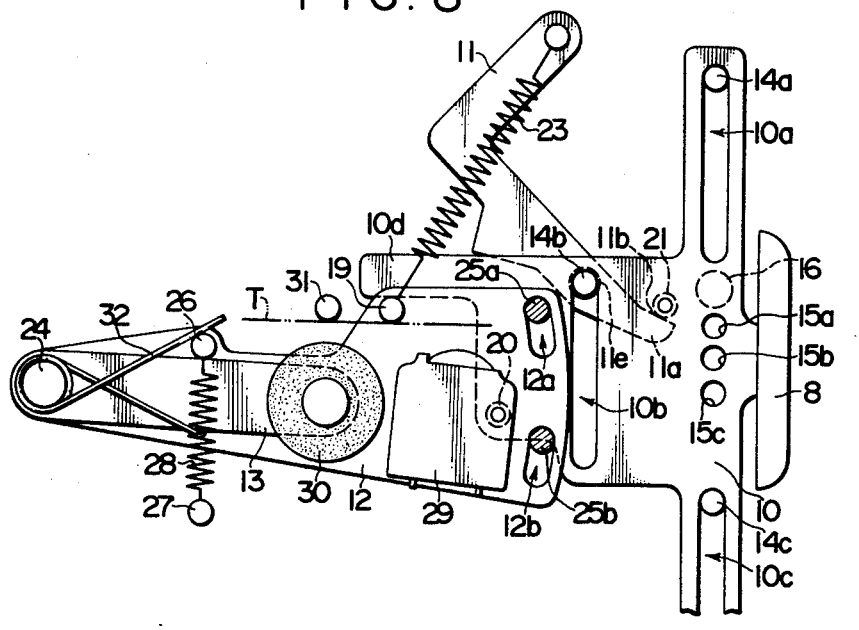

To establish a tape rewind mode of the tape recorder 1, the button 8 is moved further rearwardly beyond the playback position until the mark 8a becomes aligned with the tape rewind mark 9d (see FIG. 1). In this instance, the click-stop mechanism does not operate, so that the tape rewind is effective only during the time when the button 8 is urged in this way. When the button 8 is moved to the tape rewind position in which the mark 8a is aligned with the tape rewind mark 9d, the operating plate 10 is moved from the position shown in FIG. 7 to the position shown in FIG. 8. Such movement of the operating plate 10 causes a further rotation of the relay lever 11 about the pin 14b in the clockwise direction to cause a further elongation and hence an increase in the resilience of the spring 23. However, at this time, the projection 10d moves into abutment against the pin 19 to move it in the opposite direction against the resilience of the spring 23. As a consequence, the support member 12 and the support arm 13 are rotated clockwise, moving the pinch roller 30 and the magnetic head 29 away from the tape T. In this manner a tape rewind takes place.

In the record mode shown in FIG. 6 in which the mark 8a on the button 8 is aligned with the record mark 9b, if it is desired to record an index signal by a cue operation, the button 8 is further moved toward the front end face of the recorder 1 until the mark 8a becomes aligned with the cue mark 9e. At this time, the click-stop mechanism does not operate, so that the cue operation takes place only during the time the button 8 is urged in this manner. As the button 8 is moved from the record position to the cue position, the operating plate 10 moves from the position of FIG. 6 to the position shown in FIG. 9. Such a movement of the operating plate 10 causes a further rotation of the relay lever 11 about the pin 14b in a clockwise direction as a result of the pushing action of the pin 20 on the inclined edge 11c, thus causing a further elongation of the spring 23. However, since the extent of rotation of the head support member 12 is limited by the engagement between the slots 12a, 12b and the pins 25a, 25b, both the head support member 12 and the pinch roller support arm 13 are maintained in the record position.

Figure 9:
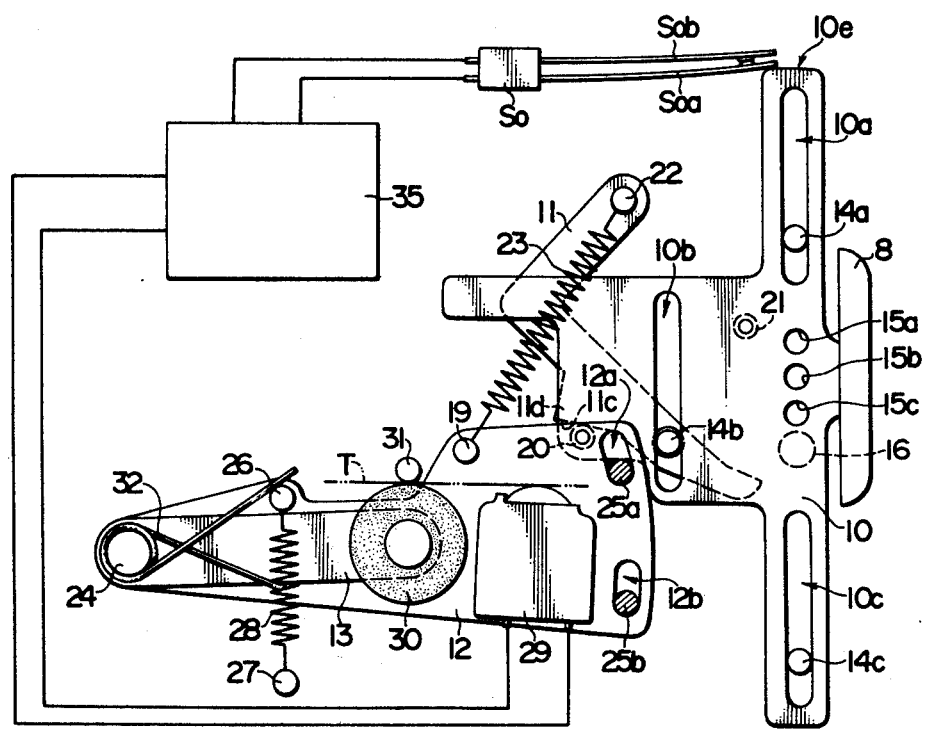

When the operating plate 10 is moved to the position shown in FIG. 9, its upper extension 10e closes the switch $S_O$, which operates the oscillator 35. Thereupon, an index signal having a frequency of 400Hz, for example, is generated by the oscillator 35 and is applied to the head 29, thus recording it on the tape T. When the button 8 is released, the resilience of the spring 23 causes the operating plate 10 and the button 8 to return to the record position shown in FIG. 16, thus permitting a continued recording operation for the purpose of dictation. It should be understood that the frequency of the index signal is not limited to any particular value such as 400Hz, the only requirement being that it be distinguishable from an ordinary signal to be recorded.

Figure 10:
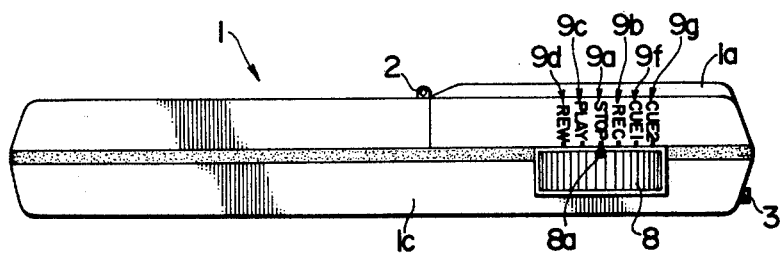
FIG. 10 is a side elevation of another form of dictating tape recorder to which the invention is applied.
Figure 11:
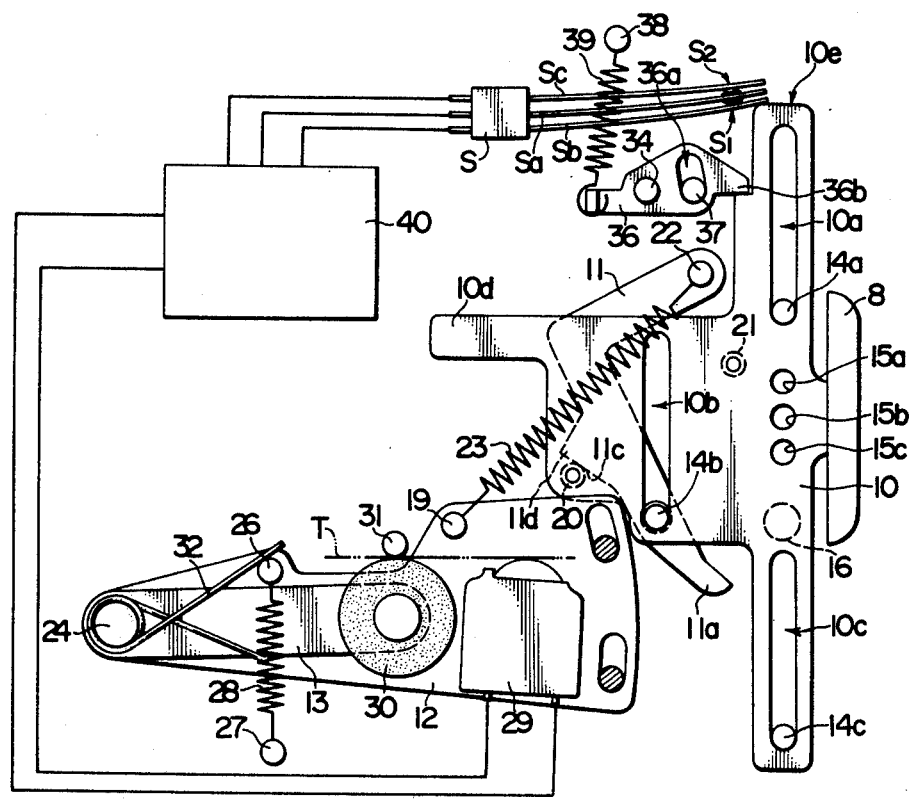
FIG. 11 is a plan view of an operating mechanism of the dictating tape recorder shown in FIG. 10.

FIGS. 10 and 11 show another arrangement of dictating tape recorder which can be utilized to record two kinds of index signals on a magnetic tape. The recorder 1' used in this instance is generally similar to that shown in FIG. 1 except that two cue marks 9f, 9g are given on the side surface 1c in juxtaposition with the record mark 9b and that the switch $S_O$ of the former arrangement is replaced by a switch S having three movable contacts Sa, Sb, Sc extending into the path of movement of the operating plate 10. The pair of movable contacts Sa and Sb form together a first actuating switch $S_1$, which, when closed, activates an oscillator 40 for producing a first index signal of a frequency of 400Hz, for example, for application to the head 29. Similarly, the pair of movable contacts Sb and Sc form together a second actuating switch $S_2$, and when both switches $S_1$ and $S_2$ are closed, the oscillator 40 is activated to produce an index signal of a different frequency, for example, 60Hz, for application to the magnetic head 29.

FIG. 11 additionally shows a return mechanism for the operating plate 10 which is interposed between the operating plate 10 and the switch assembly S. The return mechanism comprises an auxiliary plate 36 pivotally mounted on a pin 34, an elongate guide slot 36a formed in the plate 36 for limiting the extent of rocking motion thereof, a stationary pin 37 engaging the slot 36a, a detent edge 36b formed on one end of the auxiliary plate 36 and adapted to engage the operating plate 10, and a spring 39 extending between the opposite end of the auxiliary plate 36 and a stationary pin 38 for urging the auxiliary plate 36 to rotate clockwise about the pin 34. When the operating plate 10 has moved far enough to close the second actuating switch $S_2$, the detent edge 36b is engaged by the operating plate 10 to aid a returning motion thereof.

In operation, it is initially assumed that the tape recorder is in its record mode, thus the mark 8a is aligned with the record mark 9b as shown in FIG. 6. When it is desired to record a first index signal, for example, an index signal indicative of the length of a recorded content, the button 8 is moved until the mark 8a is aligned with the cue mark 9f. The operating mechanism comprising the operating plate 10 functions in a similar manner similar to that mentioned above in connection with FIG. 9 to close only the contact $S_1$ of the switch S, whereby the oscillator 40 is activated to produce a first index signal having a frequency of 400Hz, for example, which is applied to the head 29. To record a second index signal, the button is moved further toward the front end face of the recorder until the mark 8a becomes aligned with the cue mark 9g. Thereupon, the operating plate 10 moves from the position shown in FIG. 9 to the position shown in FIG. 11. As a result of such a movement of the operating plate 10, the pin 20 moves the inclined edge 11c to a further extent, whereby the relay lever 11 further rotates clockwise about the pin 14b, causing a further elongation of the spring 23. However, the head support member 12 and the pinch roller support arm 13 are maintained in their record position as mentioned above in connection with FIGS. 6 and 9.

When the operating plate 10 moves to the position shown in FIG. 11, its upper edge 10e pushes the movable contacts of the switch S, closing the both contacts $S_1$ and $S_2$, whereby the oscillator 40 is switched to produce an oscillation frequency of 60Hz, for example. The second index signal of 60Hz is applied to the magnetic head 29 to be recorded on the tape T. When the button 8 is moved to the cue position, the click-stop mechanism associated with the operating plate 10 does not operate, so that when the button 8 is released, the resilience of the spring 23 is effective to return the operating plate 10 and the button 8 to their record positions.

It is to be understood that the frequency of the first and second index signals need not be limited to 400Hz and 60Hz, respectively. What is needed is only that these signals are of frequencies which are clearly distinguishable from the frequency of a usual recorded signal.

What is claimed is:

1. Apparatus for providing a plurality of functional operations within a portable tape recorder device through the use of only a single operating button, said apparatus comprising:

slidably mounted plate means having an extension thereof carrying said button which is positioned along the exterior surface of the tape recorder housing to facilitate manipulation thereof for selective operation in either a first or a second opposing direction;

a capstan;

first swingably mounted pinch roller means;

second swingably mounted magnetic head means;

pivotally mounted intermediate lever means;

bias means interconnecting said intermediate lever means and one of said first and second swingably mounted means;

said slidable plate having a first projection adapted to pivot said intermediate lever means in a first direction when said slidable plate is urged in said first direction, and second projection means on said slidable plate adapted to pivot said intermediate lever means in the reverse direction when said slidable plate is moved in said second opposite direction;

second resilient means interconnecting said first and second swingably mounted means whereby pivotal movement of said intermediate lever means in a first direction causes movement of the first and second swingable assemblies in a first direction to move the tape head toward engagement with the tape for a record operation and to move the pinch roller toward abutting relationship with said capstan;

normally deenergized switch-actuated oscillator means engaged by said sliding plate when moved further in said direction to operate the switch of the switch-actuated oscillator means and thereby create a constant frequency signal adapted to be coupled to the aforesaid magnetic head while said capstan and pinch roller are in abutting relationship and said magnetic head and tape are in the record position.

2. The apparatus of claim 1 wherein one of said first and second swingably mounted means comprises a projection and said slide plate comprises a cooperating extension portion adapted to engage said projection when said slide plate is moved in said second direction to initiate a rewind operation for urging both said first and said second assemblies out of engagement with the tape to prevent tape drive and both recording and playback during a rewind operation.

3. The apparatus of claim 1, wherein said switch-actuated oscillator means comprises first and second switch means and said sliding plate comprises an extension thereof adapted to selectively close said switches when the plate moves to first and second positions beyond a normal record position and said oscillator means is adapted to generate different constant frequency signals dependent upon the particular switch means which are closed by said slide plate extension.

4. The apparatus of claim 1 further comprising click-stop means cooperating with said slide plate for releasably locking said slide plate in selected operating mode positions excluding the cue and fast rewind positions.

5. The apparatus of claim 1 further comprising resilient means for returning said slide plate to one of the aforesaid detent positions provided by said click-stop means when the slide plate button is released by an operator.

* * * * *